United States Patent
Naruse

(10) Patent No.: US 9,924,355 B2
(45) Date of Patent: Mar. 20, 2018

(54) SYSTEM, COMMUNICATION APPARATUS, COMMUNICATION METHOD, AND STORAGE MEDIUM STORING PROGRAM

(71) Applicant: CANON KABUSHIKI KAISHA, Tokyo (JP)

(72) Inventor: Taketomo Naruse, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 129 days.

(21) Appl. No.: 14/980,643

(22) Filed: Dec. 28, 2015

(65) Prior Publication Data
US 2016/0219433 A1    Jul. 28, 2016

(30) Foreign Application Priority Data
Jan. 23, 2015   (JP) .................................. 2015-011769

(51) Int. Cl.
| | |
|---|---|
| *H04L 29/06* | (2006.01) |
| *H04W 12/04* | (2009.01) |
| *H04W 4/00* | (2018.01) |
| *H04N 1/00* | (2006.01) |

(52) U.S. Cl.
CPC ......... *H04W 12/04* (2013.01); *H04L 63/0442* (2013.01); *H04L 63/18* (2013.01); *H04N 1/00* (2013.01); *H04W 4/008* (2013.01); *H04N 2201/0094* (2013.01)

(58) Field of Classification Search
CPC .................................................. H04L 63/0442
USPC ....................................................... 713/189
See application file for complete search history.

(56) References Cited

U.S. PATENT DOCUMENTS

| | | | |
|---|---|---|---|
| 8,117,445 B2* | 2/2012 | Werner | H04L 9/0844 713/168 |
| 9,094,780 B2 | 7/2015 | Naruse | H04W 4/008 |
| 2012/0314865 A1* | 12/2012 | Kitchen | H04L 9/0877 380/270 |
| 2013/0229673 A1 | 9/2013 | Nakayama et al. | 358/1.13 |
| 2013/0229685 A1 | 9/2013 | Naruse | 358/1.15 |

(Continued)

FOREIGN PATENT DOCUMENTS

| | | | |
|---|---|---|---|
| JP | -2011-087249 | * | 4/2011 |
| JP | 2011-087249 | | 4/2011 |

*Primary Examiner* — Longbit Chai
(74) *Attorney, Agent, or Firm* — Fitzpatrick, Cella, Harper & Scinto

(57) ABSTRACT

A system includes a first communication apparatus having an acquisition unit to acquire connection information and a public key stored in a first memory of a short distance wireless communication unit of a second communication apparatus, an encryption unit to encrypt, by using the acquired public key, data to be processed by the second communication apparatus, and a transmission unit to transmit the encrypted data to the second communication apparatus via an established long distance communication. The second communication apparatus includes a decryption unit to decrypt, by a private key which corresponds to the public key and is stored in a second memory of the second communication apparatus, the transmitted encrypted data. While the second communication apparatus operates in a power saving state, the public key is acquired by the first communication apparatus, and the private key is not able to be acquired by the first communication apparatus.

16 Claims, 14 Drawing Sheets

(56) References Cited

U.S. PATENT DOCUMENTS

2015/0002872 A1   1/2015   Naruse .................. 358/1.13
2015/0002879 A1   1/2015   Naruse .................. 358/1.14
2015/0288832 A1   10/2015  Naruse ............. H04N 1/00108

* cited by examiner

F I G. 3A
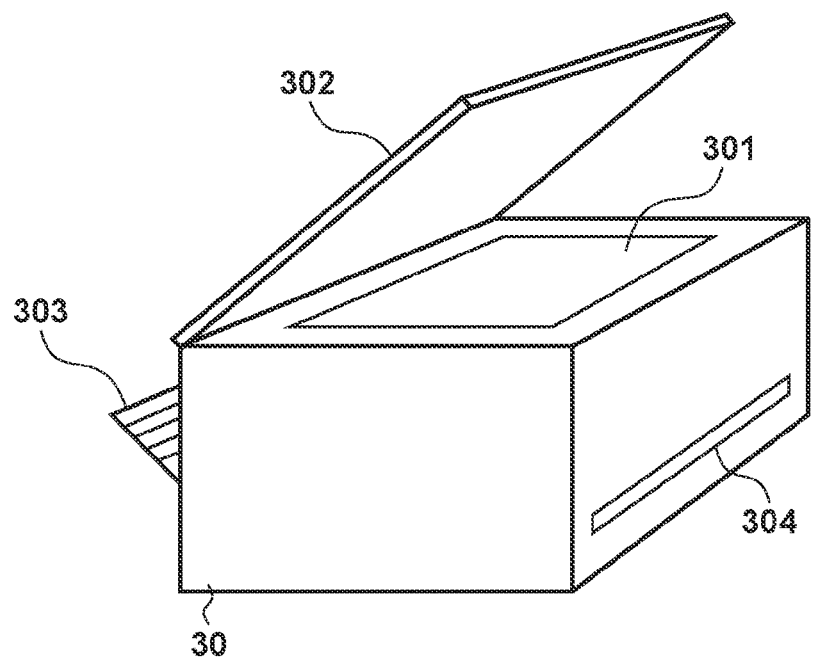
F I G. 3B
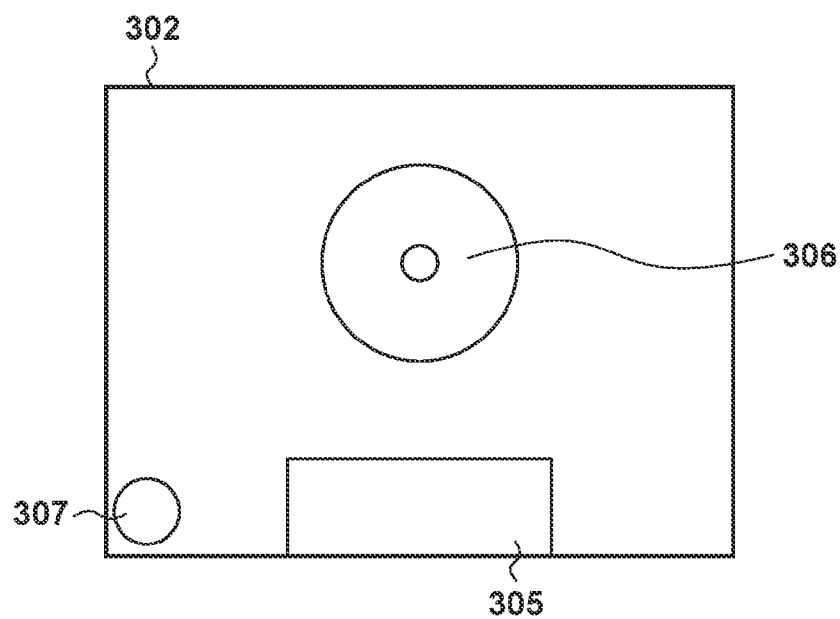

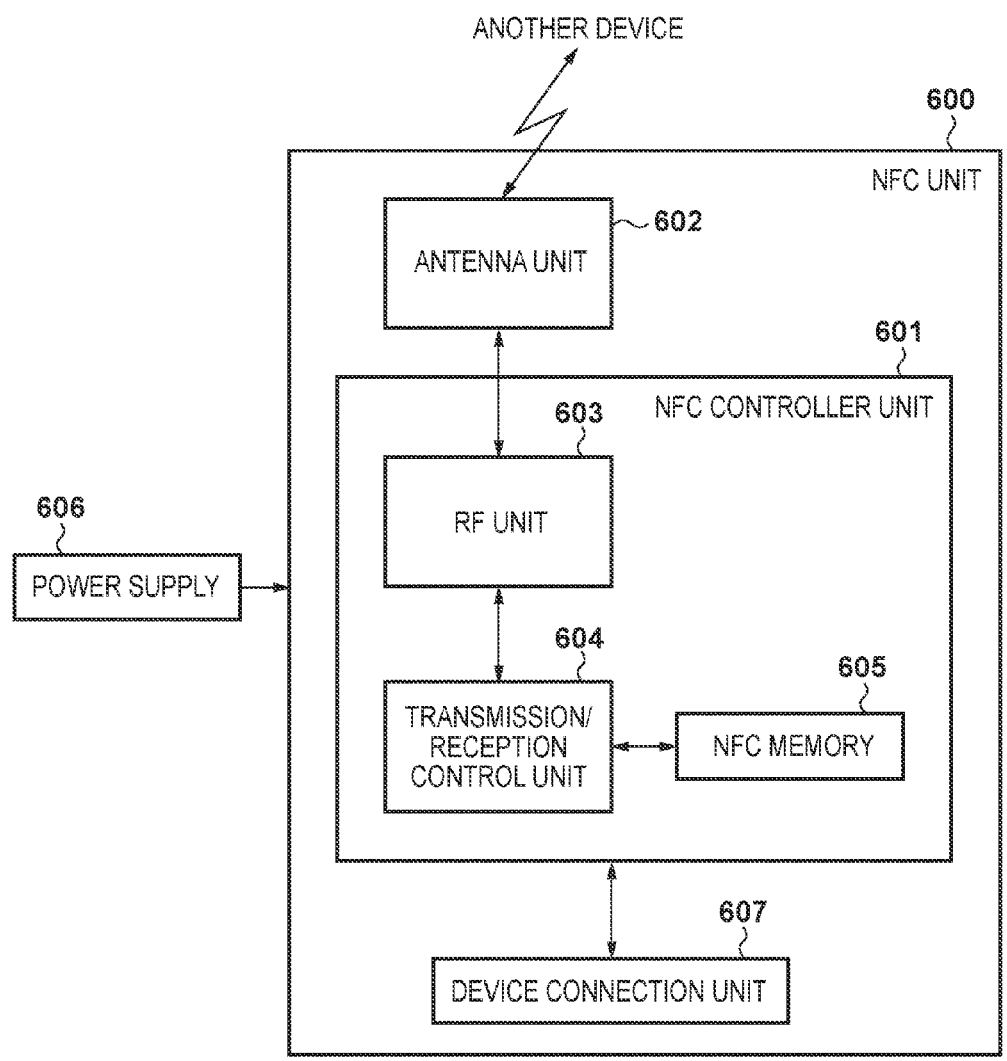

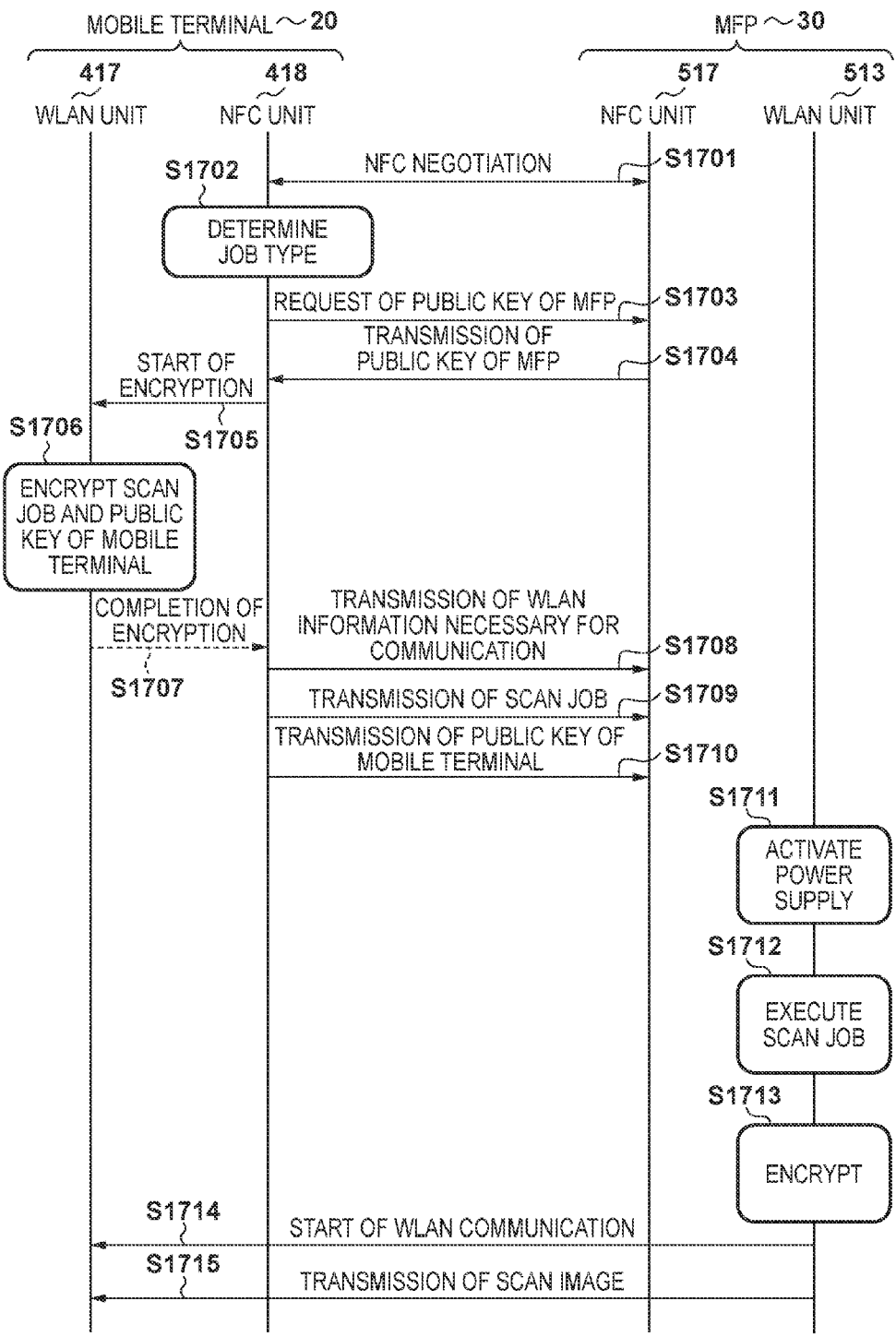

SYSTEM, COMMUNICATION APPARATUS, COMMUNICATION METHOD, AND STORAGE MEDIUM STORING PROGRAM

BACKGROUND OF THE INVENTION

Field of the Invention

The present invention relates to a system for performing near field communication, a communication apparatus, a communication method, and a storage medium storing a program.

Description of the Related Art

In recent years, it is known that a mobile terminal transmits/receives data of a relatively large size using wireless communication. To implement efficient communication in consideration of a communication speed and operability, it is known to perform data communication by two kinds of methods. There is known a technique of transmitting/receiving information necessary for the second wireless communication method of a communication target apparatus by the first short distance wireless communication capable of reliably specifying a communication partner, and performing high-speed communication by switching the communication to the second wireless communication method using the information (Japanese Patent Laid-Open No. 2011-87249).

The first short distance wireless communication method is, for example, NFC (Near Field Communication), and the second wireless communication method is, for example, Bluetooth® or wireless LAN (to be referred to as WLAN hereinafter). Japanese Patent Laid-Open No. 2011-87249 describes a printer which first transmits information of the communication method and cryptographic system of next communication by NFC and, when communication is to be switched, switches the communication to execute printing using the second wireless communication method. Processing of performing pairing by the first short distance wireless communication method and then switching the communication to the second wireless communication method will be referred to as a handover hereinafter.

On the other hand, there is known a public key cryptographic system of an algorithm for encrypting a document. The public key cryptographic system is a method of using a key for encryption/decryption generally called a distributable public key, and performs encryption processing for ciphertext, to be sent to a specific person, by using a public key issued by the specific person. Ciphertext encrypted by the public key can be decrypted by only a private key corresponding to the public key. Since the specific person who has issued the public key confidentially holds the private key, only the specific person who holds the private key can decrypt a document encrypted by the public key. An RSA cryptographic system is known as a public key cryptographic system.

Consider, for example, a case in which a handover for switching communication from NFC communication to WLAN communication is used to execute printing by transmitting data from a mobile terminal to an image processing apparatus such as a multi-function printer (to be referred to as an MFP hereinafter). In terms of security, it is desirable that protocol information and data communication information for wireless communication of the mobile terminal which performs transmission by NFC communication or WLAN communication are encrypted. Conventionally, since an encryption key is stored in the main memory of the MFP, it cannot be read out while the MFP is in a power-off mode or sleep mode. Therefore, when executing a handover while the MFP is in a power-off mode or sleep mode, the user of the mobile terminal has to wait in front of the MFP until it becomes possible to read out the encryption key from the MFP.

SUMMARY OF THE INVENTION

An aspect of the present invention is to eliminate the above-mentioned problems with the conventional technology. The present invention provides a system for starting processing by transmitting data to be processed from an information processing apparatus to an image processing apparatus regardless of the power supply state of the image processing apparatus, a communication apparatus, a communication method, and a storage medium storing a program.

The present invention in its first aspect provides a system comprising a first communication apparatus and a second communication apparatus, each of the first communication apparatus and the second communication apparatus including a near field communication unit, the first communication apparatus including an acquisition unit configured to acquire a public key stored in a memory of the near field communication unit of the second communication apparatus, an encryption unit configured to encrypt, by using the public key acquired by the acquisition unit, data to be processed by the second communication apparatus, and a transmission unit configured to transmit the encrypted data to the second communication apparatus, and the second communication apparatus including a decryption unit configured to decrypt, by a private key which corresponds to the public key and is stored in a memory of the second communication apparatus, the encrypted data transmitted by the transmission unit.

According to the present invention, it is possible to start processing by transmitting data to be processed from an information processing apparatus to an image processing apparatus regardless of the power supply state of the image processing apparatus.

Further features of the present invention will become apparent from the following description of exemplary embodiments with reference to the attached drawings.

BRIEF DESCRIPTION OF THE DRAWINGS

FIGS. 3A and 3B are a perspective view and a plan view, respectively, showing the outer appearance of an MFP;

FIG. 6 is a block diagram showing details of an NFC unit;

FIG. 17 is a sequence chart showing another operation of transmitting a scan job from a mobile terminal to an MFP.

DESCRIPTION OF THE EMBODIMENTS

Figure 1:
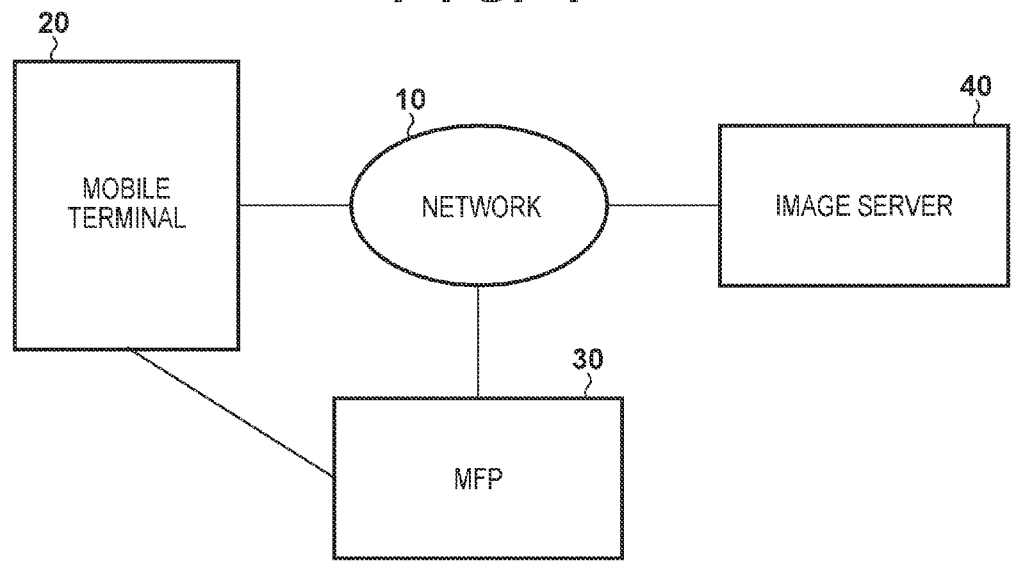
FIG. 1 is a view showing the configuration of a wireless communication system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements and a description thereof will be omitted.

First Embodiment

In this embodiment, an operation will be described in which authentication is performed by a relatively low-speed communication method using a short distance wireless communication method, and then the communication is switched to a high-speed communication method with a longer communication distance to transmit print data. For example, a printing method using a handover of performing authentication by short distance wireless communication such as NFC (Near Field Communication) and then handing over the communication to wireless communication of another communication method will be explained.

FIG. 1 is a view showing the configuration of a wireless communication system. A mobile terminal 20, an MFP 30, and an image server 40 are connected via a network 10 implemented by wired or wireless connection. The image server 40 has a print data storage function, a user ID management function, and an image processing application. The mobile terminal 20 and the MFP 30 can support at least two kinds of wireless communication methods with different authentication methods and different communication speeds. The mobile terminal 20 need only be an apparatus capable of processing image files, for example, a personal information terminal such as a smartphone, a mobile phone, a digital camera, or a personal computer. The MFP 30 is an image processing apparatus having a reading function of optically reading a document placed on a document table, and a printing function using an inkjet printing method, an electrophotographic printing method, or the like. The MFP 30 may additionally have a FAX function and a telephone function.

As an example of the connection form of FIG. 1, the network 10 and the image server 40 are connected via a wired LAN. The network 10 and the MFP 30 are connected via a wired LAN or wireless LAN (WLAN). The network 10 and the mobile terminal 20 are connected via a WLAN. Since the mobile terminal 20 and the MFP 30 have a WLAN function, they can perform peer-to-peer (P2P) communication by authenticating each other. Alternatively, the mobile terminal 20 and the MFP 30 can perform communication using NFC (to be described later) or Bluetooth®.

Figure 2:
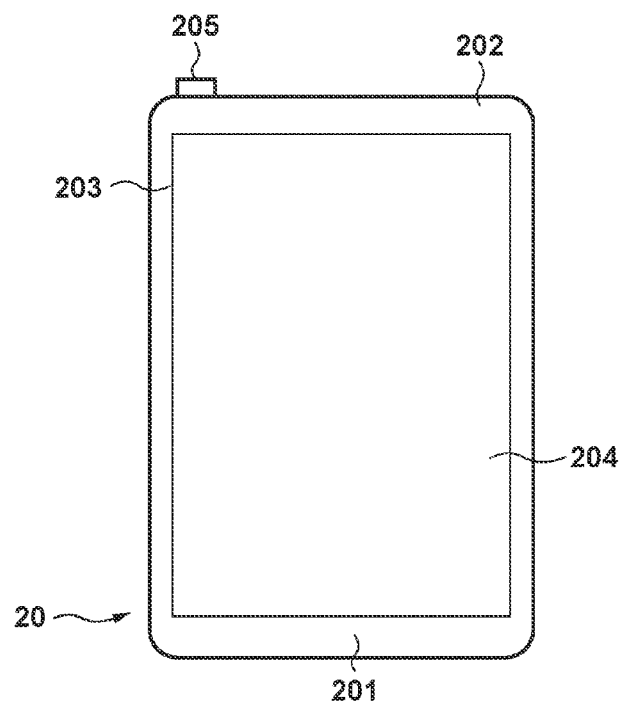
FIG. 2 is a view showing the outer appearance of a mobile terminal.

FIG. 2 is a view showing the outer appearance of the mobile terminal 20. In this embodiment, for example, a smartphone is used as the mobile terminal 20. The smartphone is a multi-function mobile phone including a camera, network browser, and mail function in addition to a mobile phone function. An NFC unit 201 performs NFC communication (to be also simply referred to as NFC hereinafter). Communication can be performed when the user actually moves the NFC unit 201 close to within about 10 cm of the NFC unit of a communication partner. A WLAN unit 202 is used to perform WLAN communication (to be also simply referred to as WLAN hereinafter), and arranged in the apparatus. A display unit 203 is a display having an LCD display mechanism or the like. An operation unit 204 has a touch-panel operation mechanism, and detects user pressing information on a screen. As a representative operation, the display unit 203 displays buttons, and the user presses a corresponding portion of the operation panel 204, thus issuing a button pressing event. A power key 205 is used to turn on/off the power.

FIG. 3A is a perspective view showing the outer appearance of the MFP 30. A document table 301 shown in FIG. 3A is a glass-like transparent table which is used to read a document by a scanner. A document cover 302 is a cover used to prevent reading light from externally leaking at the time of reading by the scanner. A printing paper insertion port 303 is an insertion port on which paper sheets of various sizes are set. Paper sheets set on the printing paper insertion port 303 are sequentially conveyed to a printing unit, and are discharged from a printing paper discharge port 304 after desired printing is executed.

As shown in FIG. 3B, an operation display unit 305 and an NFC unit 306 are arranged on the upper portion of the document cover 302. The operation display unit 305 includes an LCD with a touch panel function, and operation keys. The NFC unit 306 is a unit used to perform short distance wireless communication, and is a place to which the user moves the mobile terminal 20 closer. For example, a distance of about 10 cm from the NFC unit 306 is an effective distance of contact. A WLAN antenna 307 includes an antenna and control unit for performing WLAN communication.

Figure 4:
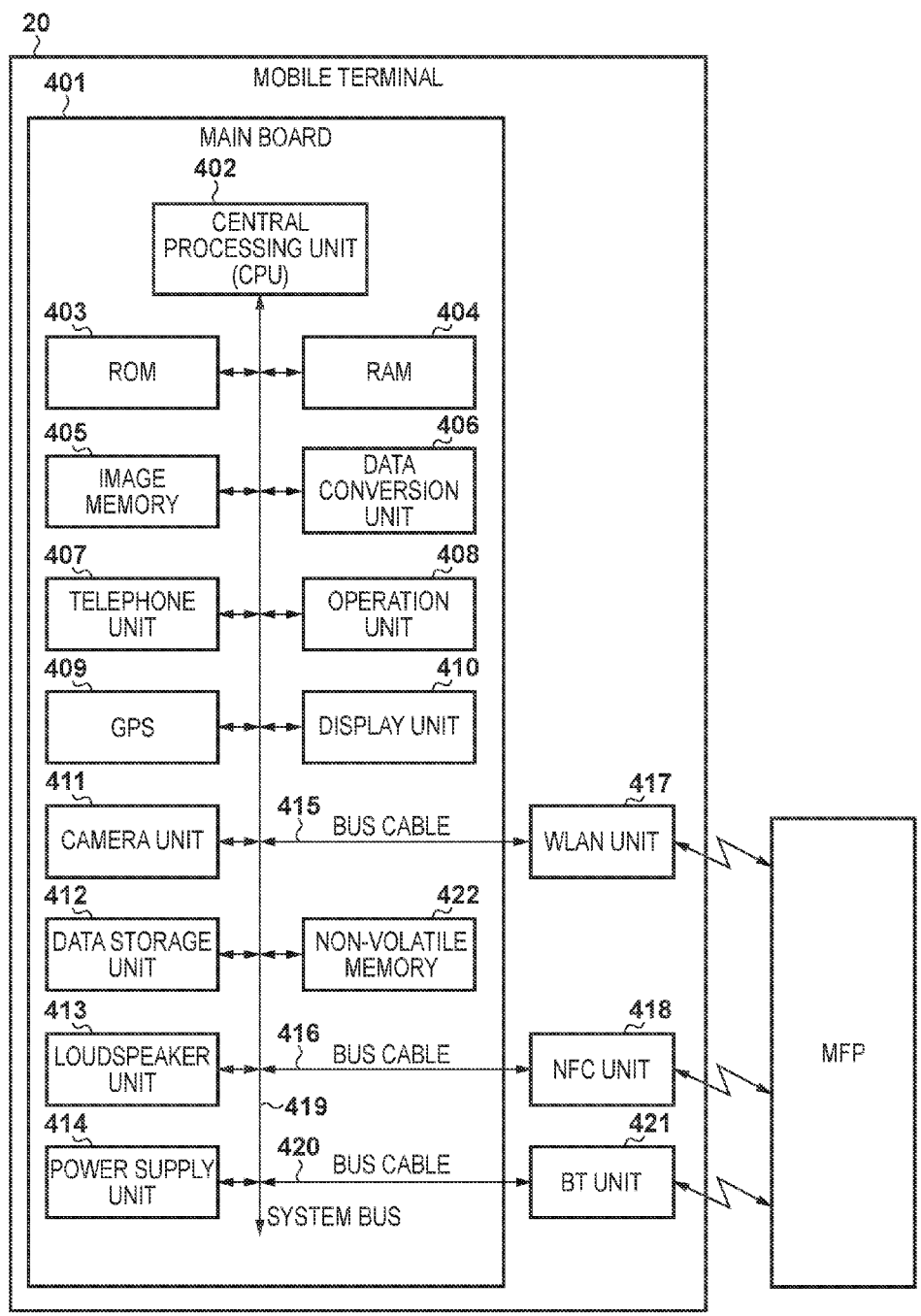
FIG. 4 is a block diagram showing the mobile terminal.

FIG. 4 is a block diagram showing the mobile terminal 20. The mobile terminal 20 is an information processing apparatus including a main board 401 for executing main control of the apparatus, a WLAN unit 417 for performing WLAN communication, an NFC unit 418 for performing NFC communication, and a BT unit 421 for performing Bluetooth® communication. A CPU 402 in the main board 401 is a system control unit, and comprehensively controls the overall mobile terminal 20. A ROM 403 stores control programs to be executed by the CPU 402, an embedded operating system (OS) program, and the like. In this embodiment, the respective programs stored in the ROM 403 execute software control such as scheduling and task switching under the management of the embedded OS stored in the ROM 403. A RAM 404 is implemented by an SRAM (Static RAM) or the like, stores program control variables and the like, also stores management data of the mobile terminal 20 and the like, and is used as various work buffer areas. The operation of the mobile terminal 20 according to each embodiment is implemented when, for example, the CPU 402 loads the program stored in the ROM 403 into the RAM 404, and executes it.

An image memory 405 is implemented by a DRAM (Dynamic RAM) or the like, and temporarily stores print data received via a communication unit and image data read out from a data storage unit 412 so as to be processed by the CPU 402. A non-volatile memory 422 is implemented by a flash memory or the like, and can store data the user wants to save even after power-off. Such data include a private key to be used for a cryptographic system (to be described later), and connection information for performing a handover. Note that the memory structure is not limited to the above-described one. For example, the image memory 405 and the RAM 404 may share a memory, or data may be backed up in the data storage unit 412. Although a DRAM is used in this embodiment, a hard disk, a non-volatile memory, or the like may be used.

A data conversion unit 406 converts image data into a data format which can undergo print processing, and executes data conversion such as color conversion and image conversion. A telephone unit 407 controls a telephone line, and implements telephone communication by processing audio data input/output via a loudspeaker unit 413. An operation unit 408 controls detection signals of the operation unit 204 described with reference to FIG. 2. A GPS (Global Positioning System) 409 acquires, for example, information of the current latitude and longitude. A display unit 410 electronically controls the display contents of the display unit 203 described with reference to FIG. 2, allows various input operations, and displays operation states, status conditions, and the like of the mobile terminal 20. A camera unit 411 has a function of electronically recording and encoding an image input via a lens. Image data captured by the camera unit 411 is saved in the data storage unit 412. The loudspeaker unit 413 has a function of inputting or outputting a speech for a telephone function, and also an alarm notification function and the like. A power supply unit 414 includes a portable battery, and executes power control for it. In this embodiment, the power supply state of the mobile terminal 20 includes a battery dead state in which the battery has no remaining amount, a power-off state in which the battery has a remaining amount but the power key 205 is not pressed, an activation state in which the apparatus is normally active, and a sleep state in which the apparatus is active but is set in a power saving state.

The mobile terminal 20 incorporates three units of the WLAN unit 417, NFC unit 418, and BT unit 421 as components for performing wireless communication. The mobile terminal 20 can perform wireless communication by WLAN, NFC, or Bluetooth®. Each of the WLAN unit 417, NFC unit 418, and BT unit 421 functions as a communication unit for performing data communication with another apparatus such as an MFP to convert data into packets or streams and transmit them to the other apparatus. Each of the WLAN unit 417, NFC unit 418, and BT unit 421 converts packets or streams coming from the other apparatus into data, and transmits them to the CPU 402.

The WLAN unit 417, NFC unit 418, and BT unit 421 are connected to a system bus 419 via bus cables 415, 416, and 420, respectively. Each of the WLAN unit 417, NFC unit 418, and BT unit 421 implements communication complying with its communication standard. Details of the NFC unit will be described later with reference to FIG. 6. The above-described components (blocks) 403 to 414, 417, 418, 421, and 422 are connected to each other via the system bus 419 managed by the CPU 402.

Figure 5:
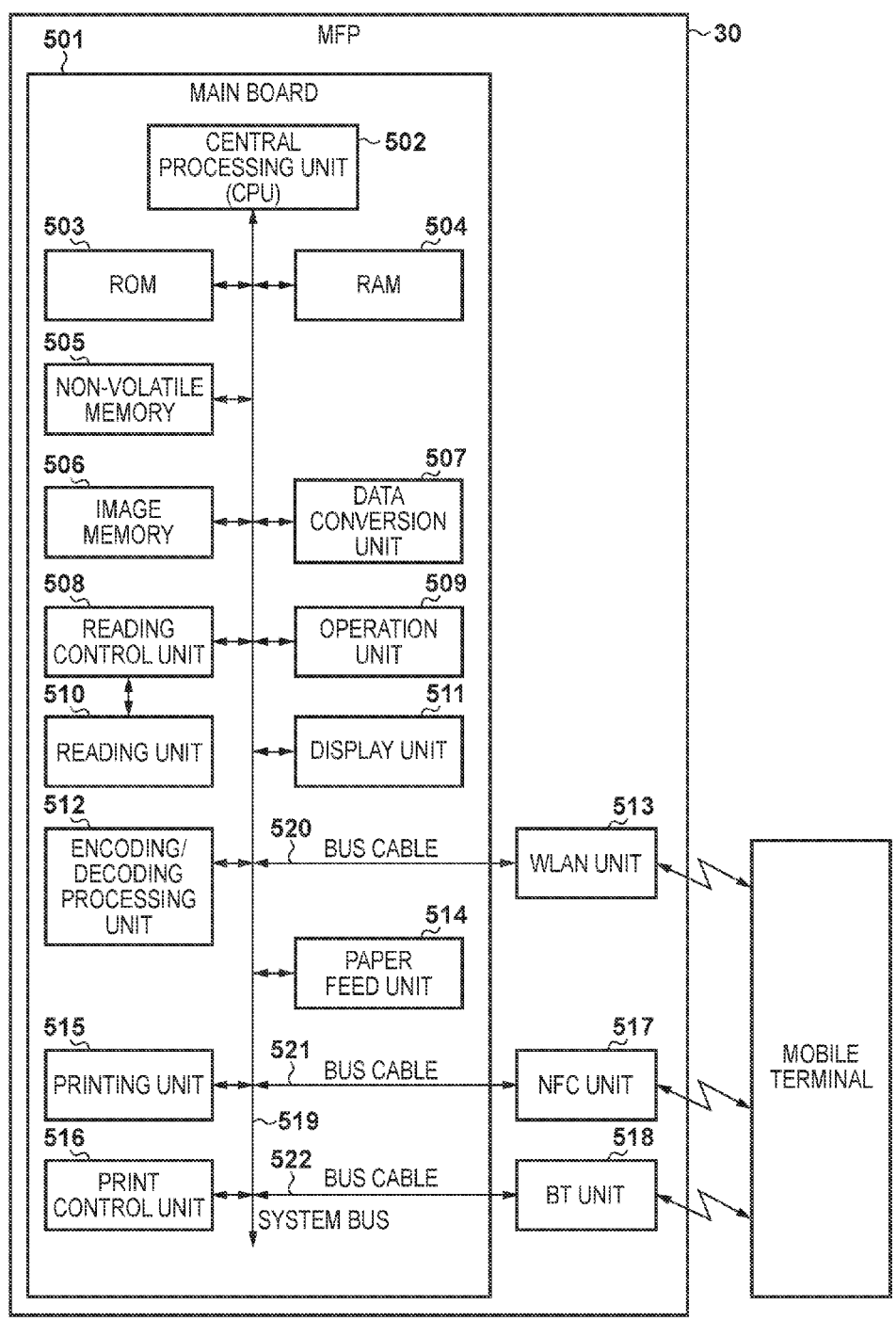
FIG. 5 is a block diagram showing the MFP.

FIG. 5 is a block diagram showing the MFP 30. The MFP 30 is an image processing apparatus including a main board 501 for executing main control of the apparatus, a WLAN unit 513 for performing WLAN communication, an NFC unit 517 for performing NFC communication, and a BT unit 518 for performing Bluetooth® communication. A CPU 502 of the main board 501 comprehensively controls the overall MFP 30. A ROM 503 stores control programs to be executed by the CPU 502, an embedded operating system (OS) program, and the like. In this embodiment, the respective control programs stored in the ROM 503 execute software control such as scheduling and task switching under the management of the embedded OS stored in the ROM 503. A RAM 504 is implemented by an SRAM (Static RAM) or the like, stores program control variables and the like, also stores management data of the MFP 30 and the like, and is allocated with various work buffer areas. The operation of the MFP 30 according to each embodiment is implemented when, for example, the CPU 502 loads the program stored in the ROM 503 into the RAM 504, and executes it.

A non-volatile memory 505 is implemented by a flash memory or the like, and can store data the user wants to hold even after power-off. Such data include a private key to be used for the cryptographic system (to be described later), connection information for performing a handover, and a setting value for defining the operation of the MFP 30. An image memory 506 is implemented by a DRAM (Dynamic RAM) or the like, and stores image data received via each communication unit, and those processed by an encoding/decoding processing unit 512. Furthermore, the memory structure is not limited to the above-described one, similarly to the memory structure of the mobile terminal 20. A data conversion unit 507 executes analysis of a page description language (PDL) and the like, conversion from image data into print data, and the like.

A reading control unit 508 will be explained. A reading unit 510 optically reads a document by a CIS image sensor (contact type image sensor). Next, the reading control unit 508 executes, via an image processing control unit (not shown), various kinds of image processing such as binarization processing and halftone processing for read out and generated image data, thereby outputting high-resolution image data. An operation unit 509 and a display unit 511 include keys operated by the user, and an LCD for displaying data to the user. The encoding/decoding processing unit 512 executes encoding/decoding processing and enlargement/reduction processing for image data (JPEG, PNG, or the like) processed by the MFP 30.

A paper feed unit 514 holds a printing medium such as printing paper, and conveys it to a print control unit 516 by conveyance rollers and the like. Especially, the paper feed unit 514 includes a plurality of paper feed units so as to hold a plurality of types of printing paper sheets in one apparatus. The CPU 502 controls, as needed, to select a paper feed unit to be used to feed paper sheets.

The print control unit 516 executes, via the image processing control unit (not shown), various kinds of image processing such as smoothing processing, printing density correction processing, and color correction for image data to be printed, and converts the image data into high-resolution image data, thereby outputting the obtained image data to a printing unit 515. The print control unit 516 also periodically reads out the state of the printing unit 515, and updates information in the RAM 504. The state of the printing unit 515 indicates, for example, the remaining amount of an ink tank, or a printhead state (characteristic information such as a discharge amount).

The MFP 30 also includes three units of the WLAN unit 513, NFC unit 517, and BT unit 518 as components for performing wireless communication, similarly to the mobile terminal 20. The functions of the three units are the same as those of the mobile terminal 20 and a description thereof will be omitted. The above-described components (blocks) 502 to 518 are connected to each other via a system bus 519 managed by the CPU 502. Although not shown in FIG. 5, the MFP 30 includes a power supply control unit for controlling power supply to each unit of the MFP 30 in response to each trigger, for example, a power supply start request from the NFC unit 517. The power supply state of the MFP 30 includes, for example, a power-off state by a user operation on the operation unit 509, an activation state in which the apparatus is normally active, and a sleep state in which the apparatus is active but is set in a power saving state wherein power supply to some units is limited.

FIG. 6 is a block diagram showing details of the NFC unit explained as the NFC unit 418 or 517. An NFC unit 600 includes an NFC controller unit 601, an antenna unit 602, an RF unit 603, a transmission/reception control unit 604, an NFC memory 605, a power supply 606, and a device connection unit 607. The antenna unit 602 receives radio waves and carriers from another NFC device, and transmits radio waves and carriers to another NFC device. The RF unit 603 has a function of modulating/demodulating an analog signal to a digital signal. The RF unit 603 includes a synthesizer, and controls bands and channels based on frequency assignment data by identifying the frequencies of the bands and channels. The transmission/reception control unit 604 executes control associated with transmission/reception, such as assembling and disassembling of a transmission/reception frame, appending and detection of a preamble, and identification of a frame. The transmission/reception control unit 604 also controls the NFC memory 605 to read/write various data and programs. A public key to be used for the cryptographic system (to be described later) is also stored in the NFC memory 605. Connection information to be used for a handover may be stored in the non-volatile memory 422 or 505 and copied to the NFC memory 605 at the time of a handover, or may be stored in advance in the NFC memory 605.

The communication mode of the NFC unit will be described. The communication mode of the NFC unit includes two modes of an active mode and passive mode. The active mode is a mode in which the NFC unit 600 has a leading role in communication by receiving power supply from the power supply 606. On the other hand, the passive mode is a mode in which the NFC unit operates by an induced current supplied from an NFC unit in the active mode (by using electromotive force generated by electromagnetic induction). In either mode, it is possible to read/write data from/in the NFC memory by accessing the NFC memory 605 of the communication partner. Especially if the NFC unit is in the passive mode, when it responds to the NFC unit of the communication partner in the active mode even if no power is supplied from the power supply 606, the NFC memory 605 of the NFC unit can be accessed by the communication partner. That is, even if the MFP 30 is in a power-off mode or sleep mode, if the NFC unit 600 of the mobile terminal 20 is in the active mode, both the devices can perform communication, or data read/write from/in the NFC memory 605.

Connection information to be used for a handover will be described. The connection information indicates connection information used to switch communication to WLAN or Bluetooth after transmitting/receiving connection information by NFC. For example, if WPS (Wi-Fi Protected Setup) is used for WLAN connection, WPS Credential authentication information is stored as connection information. If connection is performed by Bluetooth, OOB authentication information is stored as connection information. In addition, if handover connection to the server apparatus via a LAN is performed instead of WLAN or Bluetooth, network information such as the server name and IP address of the server apparatus is stored as connection information.

Figure 7A:
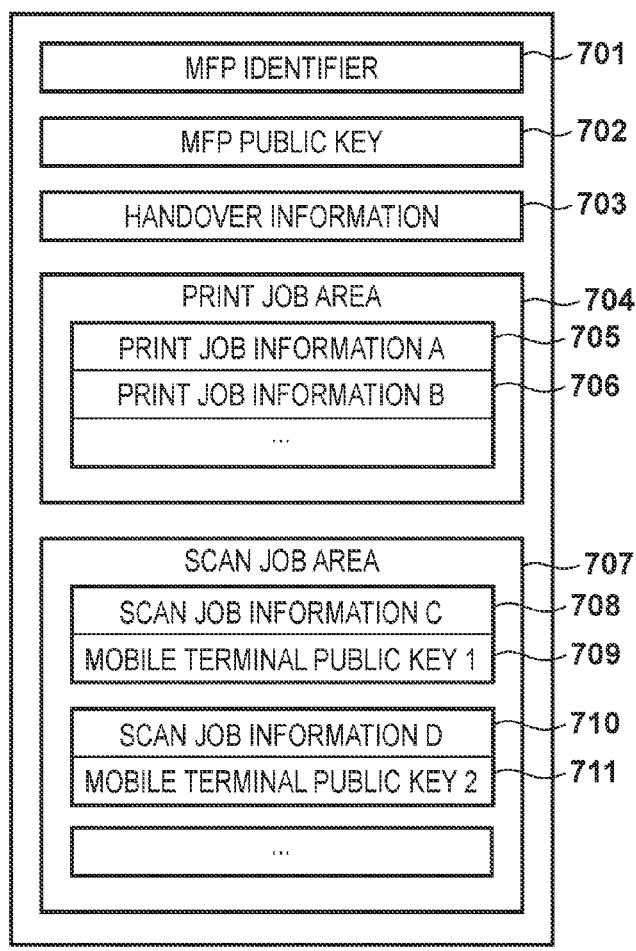
FIGS. 7A to 7C are views showing the data structure of the NFC memory of the MFP.

FIG. 7A is a view showing the data structure of the NFC memory 605 in the NFC unit 517 of the MFP 30. An MFP identifier 701 stores an ID for uniquely identifying the MFP 30, for example, the serial number or MAC address of the MFP. An MFP public key 702 is an encryption key paired with an MFP private key 801 (to be described later). By using a characteristic in which information encrypted by a public key can generally be decrypted by only a private key, the mobile terminal 20 according to this embodiment can securely transmit data to the MFP 30. As shown in FIG. 7A, the MFP public key 702 is stored in the NFC memory 605 externally accessible even if the MFP 30 is in a power-off state or sleep state. With this arrangement, the mobile terminal 20 operated by the user can acquire the MFP public key any time by NFC communication regardless of the power supply state of the MFP 30. In general, the NFC memory 605 accessible even if the apparatus is in the power-off state tends to have low security. To cope with this, in this embodiment, by managing, in the NFC memory, the public key which may be opened, and managing, in the memory of the MFP main body (that is, the communication apparatus), a private key which needs to be confidential, it is possible to maintain the security while improving the user convenience of performing a handover.

Handover information 703 stores connection information for performing handover connection to the MFP 30 after NFC communication. For example, the connection information is the OOB authentication information or the WPS Credential authentication information of the MFP 30, as described above. A print job area 704 stores a print job transmitted from the mobile terminal 20 by NFC communication. As shown in FIG. 7A, print jobs are queued like print job information A, B, . . . . The reason why a job queue is used is that the user may transmit a job and immediately execute it, or transmit a plurality of jobs at once and execute them. In this embodiment, the mobile terminal 20 can transmit a job even while the MFP 30 is in the power-off state or sleep state, and also transmit a plurality of jobs while the MFP 30 is active.

Figure 7B:
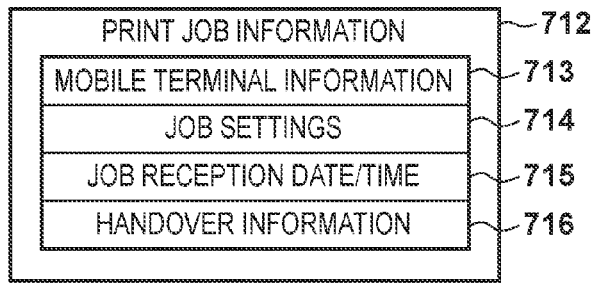

FIG. 7B is a view for explaining details of the print job information. Mobile terminal information 713 stores information for uniquely identifying a mobile terminal which has transmitted a job. Job settings 714 store a job type, and also store information indicating a print job as well as information indicating an apparatus from which a handover is performed and a location in which image data to be used for the print job is stored. Based on these pieces of information, the MFP 30 can determine whether connection starts in response to a request from the mobile terminal 20 after the end of NFC communication or starts from the MFP in accordance with handover information 716. A job reception date/time 715 stores information of the date/time at which the job is received. The handover information 716 stores information to be used to start, from the MFP 30, connection to the mobile terminal 20.

A scan job will be explained next. The scan job will be processed in the second embodiment and subsequent embodiments. The user of the mobile terminal 20 transmits a scan job to the MFP by NFC communication. The scan job received by the MFP 30 is queued in a scan job area 707.

Figure 7C:
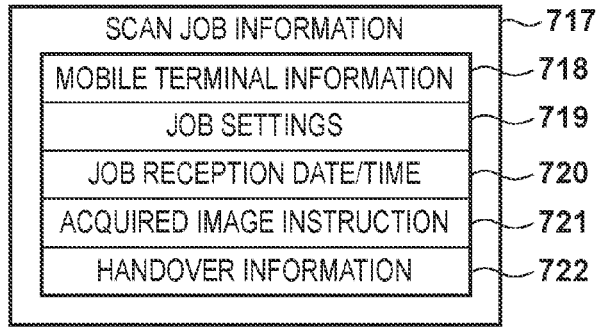

FIG. 7C is a view for explaining details of information of the scan job. Mobile terminal information 718 is the same as the mobile terminal information 713. Job settings 719 store reading settings at the time of scanning. The reading settings indicate, for example, scan setting information including a scan resolution, an image file format, and an image correction instruction. A job reception date/time 720 is the same as the job reception date/time 715. An acquired image instruction 721 stores information indicating a method of transmitting, to the mobile terminal 20, a scan file acquired by scanning. For example, the information indicates whether the MFP 30 performs connection to the mobile terminal 20 using handover information 722 to transmit the scan file immediately after scanning or the mobile terminal 20 accesses the MFP 30 to acquire the scan file. The handover information 722 is the same as the handover information 716.

Unlike the print job area 704, mobile terminal public keys 709 and 711 each paired with the scan job information are stored. Since the MFP 30 can receive in advance the public key of the mobile terminal 20, it can encrypt scanned image data (scan data) before transmitting it to the mobile terminal. Furthermore, the MFP 30 can encrypt data while scanning it. With this arrangement, image data which has been scanned but has not been encrypted is not communicated, thereby enhancing the security. Furthermore, it is possible to improve the user convenience by performing encryption in the MFP 30.

Figure 8:
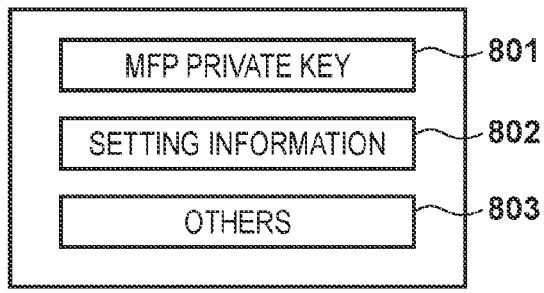
FIG. 8 is a view showing the structure of the non-volatile memory of the MFP.

FIG. 8 is a view showing the structure of the non-volatile memory 505 of the MFP 30. For example, a flash memory is used as the non-volatile memory. The MFP private key 801 stores an encryption key paired with the MFP public key 702. As compared with the NFC memory 605, the non-volatile memory 505 of the main body of the MFP 30 has relatively high security. Setting information 802 stores a setting value when operating the MFP 30. The setting value is, for example, a setting value when executing the printing function or scan function of the MFP 30. Others 803 store information other than the MFP private key 801 and setting information 802, for example, connection information for performing a handover.

Figure 9:
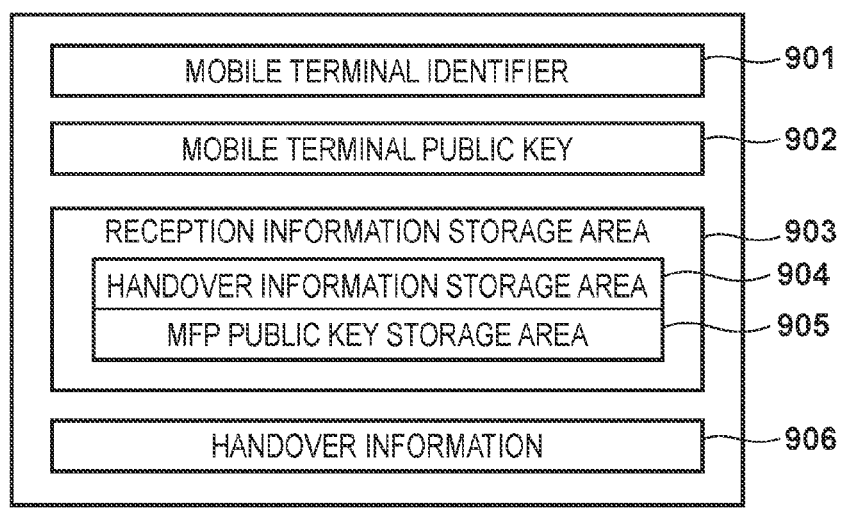
FIG. 9 is a view showing the data structure of the NFC memory of the mobile terminal.

FIG. 9 is a view showing the data structure of the NFC memory 605 of the NFC unit 418 of the mobile terminal 20. A mobile terminal identifier 901 stores identification information for uniquely specifying the mobile terminal 20. A mobile terminal public key 902 stores the public key of the mobile terminal 20. The mobile terminal public key 902 is used to encrypt in advance scan data in the MFP 30 by transferring the public key of the mobile terminal 20 to the MFP 30 when requesting a scan job of the MFP 30. In addition to the scan data, the mobile terminal public key 902 is also used in the same manner for information to be encrypted in advance for a communication partner terminal.

A reception information storage area 903 stores data received from the MFP 30 by NFC communication. For example, a handover information storage area 904 stores connection information for connection to the MFP 30 by a handover. An MFP public key storage area 905 stores the received MFP public key 702. In this embodiment, when executing a print job, an MFP public key is received in advance. Therefore, since the mobile terminal 20 can immediately start encryption of image data to be printed by the print job, it is possible to reduce the standby time of the MFP 30 in preparing image data after activation of the MFP 30. Handover information 906 is connection information used by the MFP 30 to perform connection to the mobile terminal 20 by a handover. When connection is performed from the MFP 30 to the mobile terminal 20 by a handover, the MFP 30 acquires in advance the handover information 906 from the mobile terminal 20.

Figure 10:
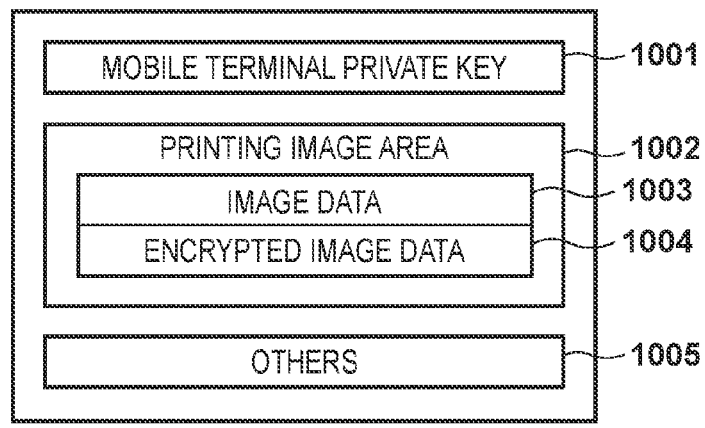
FIG. 10 is a view showing the structure of the non-volatile memory of the mobile terminal.

FIG. 10 is a view showing the structure of the non-volatile memory 422 of the mobile terminal 20. A mobile terminal private key 1001 stores a private key paired with the mobile terminal public key 902. A printing image area 1002 stores image data 1003 to be printed and an encrypted image data 1004. The encrypted image data 1004 stores data as a result of encrypting the image data 1003 using the public key in the MFP public key storage area 905.

Figure 11:
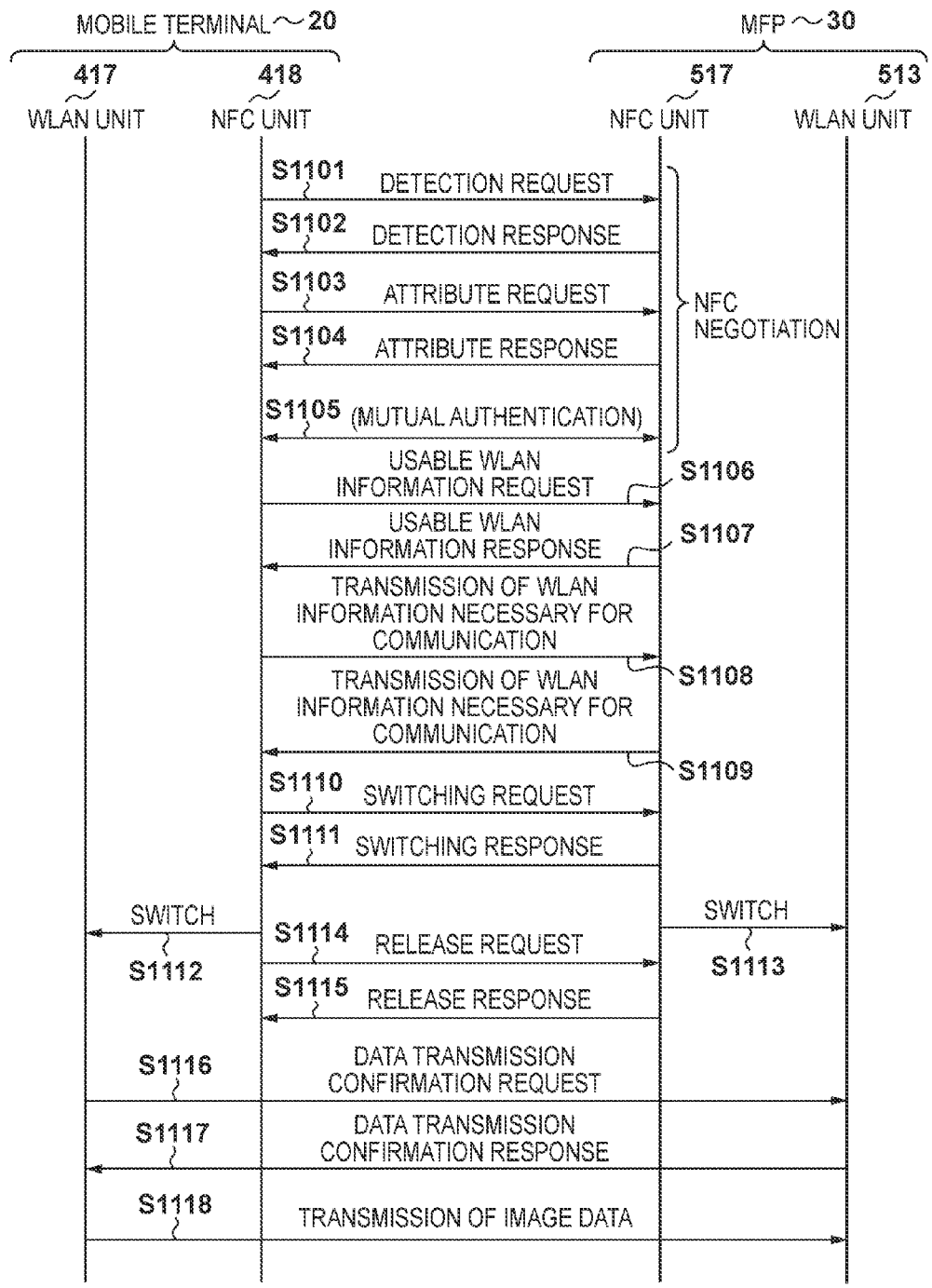
FIG. 11 is a sequence chart showing an operation of a handover.

FIG. 11 is a sequence chart showing an operation of a so-called push handover in which the mobile terminal 20 has a leading role in transferring image data existing in the mobile terminal 20 to print it by the MFP 30. FIG. 11 shows the WLAN units 417 and 513 and the NFC units 418 and 517 with respect to the mobile terminal 20 and the MFP 30, which are communication units used to communicate with the communication partner in respective steps. The main body of processing in the apparatus in each step may be the CPU. The same applies to FIGS. 12 to 14, 16, and 17. Note that in this specification, the processing shown in FIG. 11 is normally performed. However, if a security mode is selected, processes shown in FIGS. 12 to 17 (to be described later) may be executed.

In S1101, the NFC unit 418 of the mobile terminal 20 detects the NFC unit 517 to detect an NFC communication partner. If the NFC unit 517 is correctly detected, the NFC unit 517 of the MFP 30 transmits a detection response in S1102. Note that the mobile terminal 20 starts NFC communication connection in FIG. 11 but the MFP 30 may start NFC communication connection based on a user input from the operation display unit 305 of the MFP 30 or the like. If the NFC unit 418 correctly receives the detection response, the NFC unit 418 transmits, in S1103, an attribute request for performing NFC communication. In S1104, the NFC unit 517 returns an attribute response to the mobile terminal 20. With the attribute request and attribute response, the NFC-IDs of both the apparatuses are transmitted, and each apparatus can specify the communication partner using the NFCID. In S1105, each of the mobile terminal 20 and the MFP 30 authenticates the communication partner specified using the NFCID. The processes in S1101 to S1105 will be referred to as NFC negotiation hereinafter.

In S1106, the NFC unit 418 requests, of the NFC unit 517, information of a communication protocol usable by the MFP 30. The request includes information of a communication protocol usable by the mobile terminal 20. For example, upon receiving the request, the NFC unit 517 can recognize that WLAN communication of the mobile terminal 20 is usable. In S1107, the NFC unit 517 responds to the request received in S1106 using the information of the usable communication protocol of itself. The processes in S1106 and S1107 allow the mobile terminal 20 and the MFP 30 to recognize the usable communication protocol of one another.

Assume that the mobile terminal 20 determines to perform communication by switching communication to WLAN since WLAN with a communication speed higher than that of NFC is usable. Note that the MFP 30 may perform the determination processing for switching. If switching is determined, the mobile terminal 20 and the MFP 30 exchange necessary connection information necessary for WLAN communication in S1108 and S1109. The connection information is, for example, the above-described WPS Credential authentication information.

After that, in S1110, the NFC unit 418 transmits a request to switch the communication from NFC to WLAN. Upon receiving the switching request, the NFC unit 517 transmits, in S1111, a response to accept switching. After transmitting the switching response, the communication unit is switched from the NFC unit 418 to the WLAN unit 417 in S1112. In S1113, the communication unit is switched from the NFC unit 517 to the WLAN unit 513. After the communication unit is switched, the NFC unit 418 transmits an NFC communication release request in S1114. Upon receiving the NFC communication release request, the NFC unit 517 transmits a release response in S1115. After that, NFC communication between the NFC units 418 and 517 ends.

In S1116 and subsequent steps, WLAN communication is executed based on the pieces of connection information for WLAN communication exchanged in S1108 and S1109. In S1116, the WLAN unit 417 requests the WLAN unit 513 to confirm whether data transfer is possible. Contents which need to be confirmed are, for example, data indicating whether there is a sufficient free space to temporarily save image data to be transferred to the MFP 30, and data indicating whether an image format is processable by the MFP 30. After receiving the confirmation request, the WLAN unit 513 transmits, in S1117, a response to the confirmation request. After receiving the response, if it is determined that data transfer is possible, the WLAN unit 417 transmits, in S1118, image data to be printed from the mobile terminal 20 to the WLAN unit 513.

As described above, it is possible to perform authentication by NFC as near field communication with relatively high security, and then transfer a large amount of data by switching the communication protocol to a higher-speed communication protocol.

An operation of transmitting a print job from the mobile terminal 20 to the MFP 30 by a handover and executing it will be described with reference to FIG. 12. Assume that the MFP 30 is in the power-off state or sleep mode. Note that the power-off state in this embodiment is a state in which the apparatus can transit to a power-on state by receiving a power supply activation request command from the mobile terminal 20. The user selects, on the application of the mobile terminal 20, image data to be printed and, in this state, moves the mobile terminal 20 closer to the NFC unit 517 of the MFP 30 (or moves the mobile terminal 20 to touch the NFC unit 517). As a result, in S1216 (to be described later), a print job based on the selected image data to be printed is encrypted, and transmitted to the MFP 30. In S1201, the above-described NFC negotiation is performed. In S1202, the mobile terminal 20 determines the type of job to be executed. For example, whether the job to be executed is a print job or scan job, the presence/absence of encryption, a handover method, and the like are determined. In this example, assume that a print job is determined. If the CPU 402 of the mobile terminal 20 executes the determination processing in S1202, determination result information is output to the NFC unit 418.

In S1203, the NFC unit 418 acquires the handover information 703 of the MFP 30 by sending a request to the NFC unit 517, and stores it in the handover information storage area 904. In S1204 and S1205, the NFC unit 418 acquires the MFP public key 702 of the MFP 30 by sending a request to the NFC unit 517, and stores it in the MFP public key storage area 905. At this time, the mobile terminal 20 can start encryption of the image data to be printed by the print job. Only the image data may be encrypted or the image data may be encrypted together with various commands including the print job.

In S1206, the NFC unit 418 notifies the CPU 402 of an encryption start trigger together with the MFP public key 702. In S1207, the CPU 402 encrypts the image data to be printed, and outputs the encrypted image data to the WLAN unit 417. Along with the processing in S1206, the NFC unit 418 transmits a power supply activation request to the MFP 30 in S1209. As encryption starts, this power supply activation request is sent as a trigger (request information) for requesting the MFP 30 to process the data as the execution target of the job. Note that in S1209, print job information is sent together with the power supply activation request.

In S1210, the NFC unit 517 outputs the power supply activation start trigger to the main board 501 via a bus cable 521. In S1211, activation of the power supply of the MFP 30 is started. Along with activation of the power supply of the MFP 30, the mobile terminal 20 transmits an NFC communication release request in S1212 and the MFP 30 transmits a release response in S1213. After that, NFC communication between the NFC units 418 and 517 ends.

After the end of the encryption processing in S1207, for example, the CPU 402 stores the encrypted image data in the encrypted image data 1004 of the non-volatile memory 422, and notifies the WLAN unit 417 of the end of the encryption processing. In S1208, the WLAN unit 417 notifies the NFC unit 418 of the end of the encryption processing.

In S1214, the WLAN unit 417 monitors activation of the power supply of the MFP 30. This may be performed by, for example, transmitting, by WLAN, a command capable of confirming connection to the communication partner, and determining whether a response can be sent. Upon end of power supply activation in S1211, the WLAN unit 417 attempts to perform connection to the MFP 30 using the handover information 703 of the MFP 30 acquired in S1203. If power supply activation of the MFP 30 has ended, mutual WLAN communication starts between the WLAN units 417 and 513 in S1215. In S1216, the WLAN unit 417 transmits, by WLAN, the print job together with the encrypted image data 1004 encrypted in advance. Upon receiving the print job by the WLAN unit 513, the MFP 30 decrypts the encrypted image data using the MFP private key 801 corresponding to the MFP public key 702, and performs print processing for the decrypted image data.

As described above, even if the MFP 30 is in the power-off state or sleep state, the mobile terminal 20 can acquire the MFP public key from the NFC memory 605 of the MFP 30. With this arrangement, the mobile terminal 20 can in parallel asynchronously perform the encryption processing in S1206 to S1208, the power supply activation processing in S1209 to S1211, and the NFC release processing in S1212 and S1213. Therefore, when the user executes the print job, he/she can perform a print job execution operation by moving the mobile terminal 20 closer to the MFP 30 without waiting for activation of the MFP 30. It is possible to maintain the security by encryption of the data associated with the print job using the public key. In addition, since the MFP 30 stores the private key in the non-volatile memory, and stores the public key in the NFC memory 605 with security lower than that of the non-volatile memory, it is possible to prevent the private key from leaking and improve the effect of maintaining the security of the data to be encrypted.

Second Embodiment

An operation of transmitting a scan job from a mobile terminal 20 to an MFP 30 by NFC communication and then switching the communication by a handover to transmit scan data from the MFP 30 to the mobile terminal 20 will be described with reference to FIG. 13. The difference from the first embodiment will be explained below. This embodiment assumes that the MFP 30 is in a power-off state or sleep mode. Note that the power-off state in this embodiment is a state in which the apparatus can transit to a power-on state by receiving a power supply activation request command from the mobile terminal 20. Processes in S1301 and S1302 are the same as those in S1201 and S1202. This embodiment assumes that a scan job is determined. If a scan job is determined, the MFP 30 needs to cause the mobile terminal 20 to transmit image data generated by performing scan processing. In S1304, therefore, an NFC unit 418 transmits, to the MFP 30, connection information necessary for the MFP 30 to perform WLAN connection to the mobile terminal 20 by a handover. For example, the mobile terminal 20 transmits handover information 906, thereby storing the information in handover information 722 of an NFC unit 517 of the MFP 30.

In S1305, when the NFC unit 418 transmits a scan job, scan job information is stored in mobile terminal information 718, job settings 719, job reception date/time 720, and acquired image instruction 721 of FIG. 7C. In S1306, the NFC unit 418 transmits a mobile terminal public key 902 to a mobile terminal public key 709 of the NFC unit 517, thereby storing it.

In S1307, activation of the power supply of the MFP 30 is started. A power supply activation start trigger may be provided in the same method as in S1210. If the power supply of the MFP 30 is activated, a CPU 502 executes, in S1308, scan processing based on the scan job saved in the NFC memory of the NFC unit 517. In S1309, the CPU 502 reads out, from the NFC memory of the NFC unit 517, the mobile terminal public key 709 acquired in S1306, and encrypts scan data.

In S1310, a WLAN unit 513 performs WLAN connection to the mobile terminal 20 using the handover information 722. In S1311, the WLAN unit 513 transmits the encrypted image data. After that, a WLAN unit 417 decrypts the encrypted image data using a mobile terminal private key 1001 corresponding to the mobile terminal public key 902, thereby completing the scan job.

As described above, the mobile terminal 20 transmits and stores in advance its public key in the NFC memory which does not need the power supply of the MFP 30. As a result, it is possible to acquire in advance the mobile terminal public key 709 which is originally to be acquired when the MFP 30 performs connection again after activating the power supply. Therefore, it is possible to eliminate processing of bringing the apparatuses into contact with each other by NFC twice, and processing of performing WLAN communication to only acquire the mobile terminal public key 709 after the MFP 30 is activated.

Third Embodiment

Figure 14:
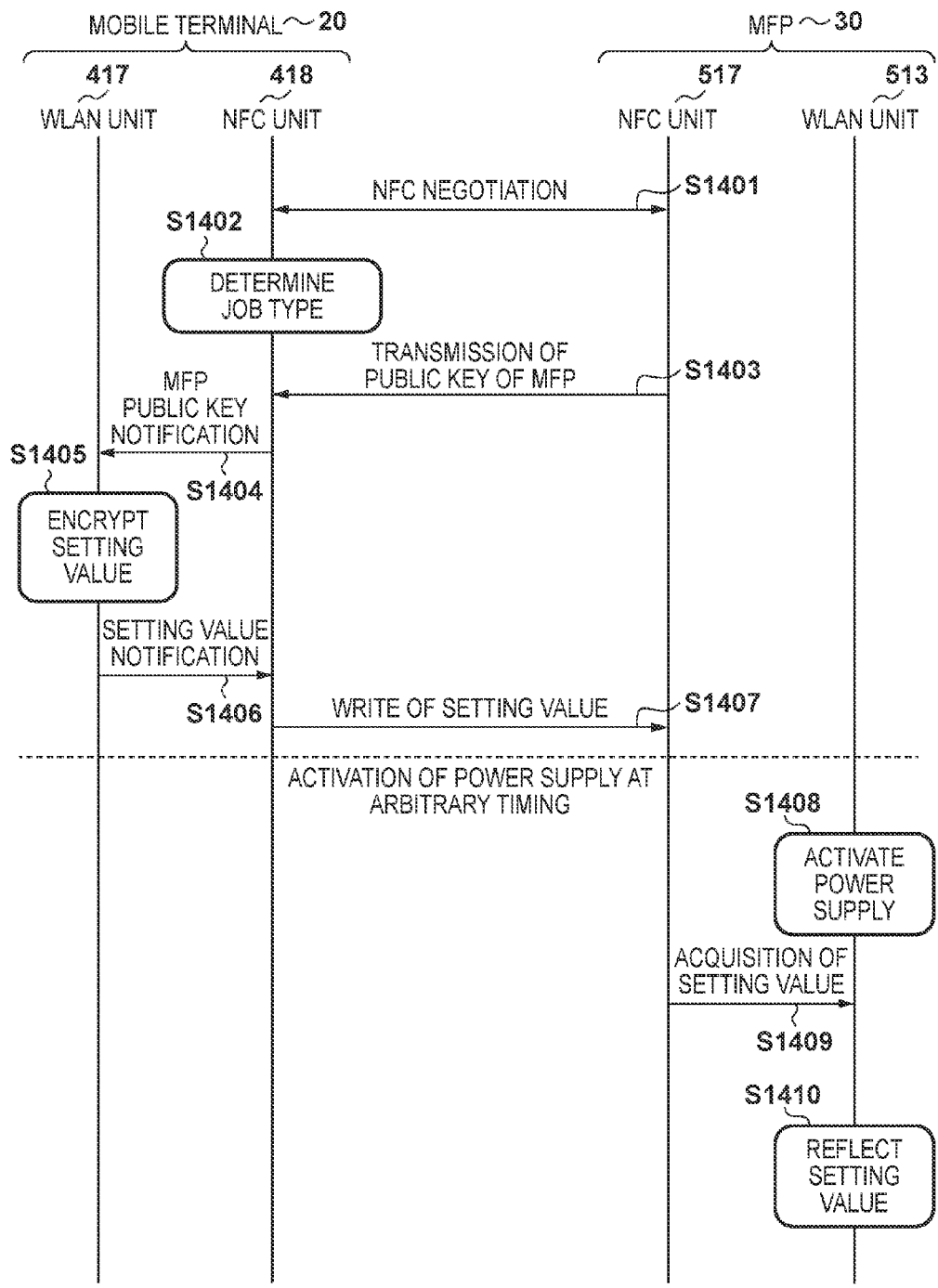
FIG. 14 is a sequence chart showing an operation of transmitting a setting change job from a mobile terminal to an MFP.

An operation of transmitting, from a mobile terminal 20 to an MFP 30 by NFC communication, a setting change job of changing the setting value of the MFP 30 will be explained with reference to FIG. 14. The difference from the first and second embodiments will be described below. The setting change job is a job for performing setting processing of changing setting information 802 of the MFP 30, for example, changing the operation mode of the MFP 30, changing a default setting value, or adding an address to an address book. This embodiment assumes that the MFP 30 is in a power-off state or sleep mode. Note that the power-off state in this embodiment is a state in which the apparatus can transit to a power-on state by receiving a request from the mobile terminal 20.

Since an NFC memory 605 of an NFC unit 517 can be accessed to read/write data even if the MFP 30 is in the power-off state or sleep mode, it can store a setting change job. Since the NFC memory has security lower than that of a non-volatile memory or the like, it is desirable to encrypt the setting change job in the mobile terminal 20 and store the encrypted setting change job in terms of security. However, the public key of the MFP 30 is necessary to perform encryption. To cope with this, in this embodiment, the public key of the MFP 30 is stored in advance in the NFC memory 605 of the MFP 30, and the mobile terminal 20 acquires the public key, encrypts the setting change job, and transmits the encrypted setting change job to the MFP 30. The setting change job includes setting data to be newly set.

In S1401, the above-described NFC negotiation is performed. In S1402, the same determination processing as in S1202 is performed. Assume that a setting change job is determined. If a setting change job is determined, the NFC unit 418 acquires an MFP public key 702 from the NFC unit 517 and stores it in an MFP public key storage area 905 in S1403. In S1404, an NFC unit 418 notifies a CPU 402 of an encryption start trigger together with the MFP public key 702.

In S1405, the CPU 402 encrypts a setting value. At this time, only the setting value may be encrypted, communication data including the setting value may be encrypted, or the setting value may be encrypted together with a command. Upon end of encryption, in S1406, the CPU 402 notifies the NFC unit 418 of the end of encryption, and temporarily stores the encrypted setting change job in the NFC memory 605.

In S1407, the NFC unit 418 stores the encrypted setting change job in the NFC memory 605 of the NFC unit 517. The setting change job is executed at a timing of next activation of the MFP 30. The timing of next activation indicates, for example, a timing at which the power supply state of the MFP 30 is returned from the sleep mode to a normal mode after a predetermined time elapses. The MFP 30 may be activated immediately after the processing in S1407. An activation condition may be determined based on the contents stored in the NFC unit 517, and the MFP 30 may be activated when the activation condition is satisfied. Upon activation of the power supply of the MFP 30 in S1408, a CPU 502 acquires, in S1409, the setting value stored in S1407. The setting value is decrypted using an MFP private key 801 corresponding to the MFP public key 702 to change the setting information 802 in S1410, thereby terminating the processing shown in FIG. 14.

As described above, even for personal information with high security, such as an address book, it is not necessary to acquire a public key by activating the MFP 30 once. In addition, by making a setting change after encryption, it is possible to maintain the security of the setting value.

Fourth Embodiment

Figure 15:
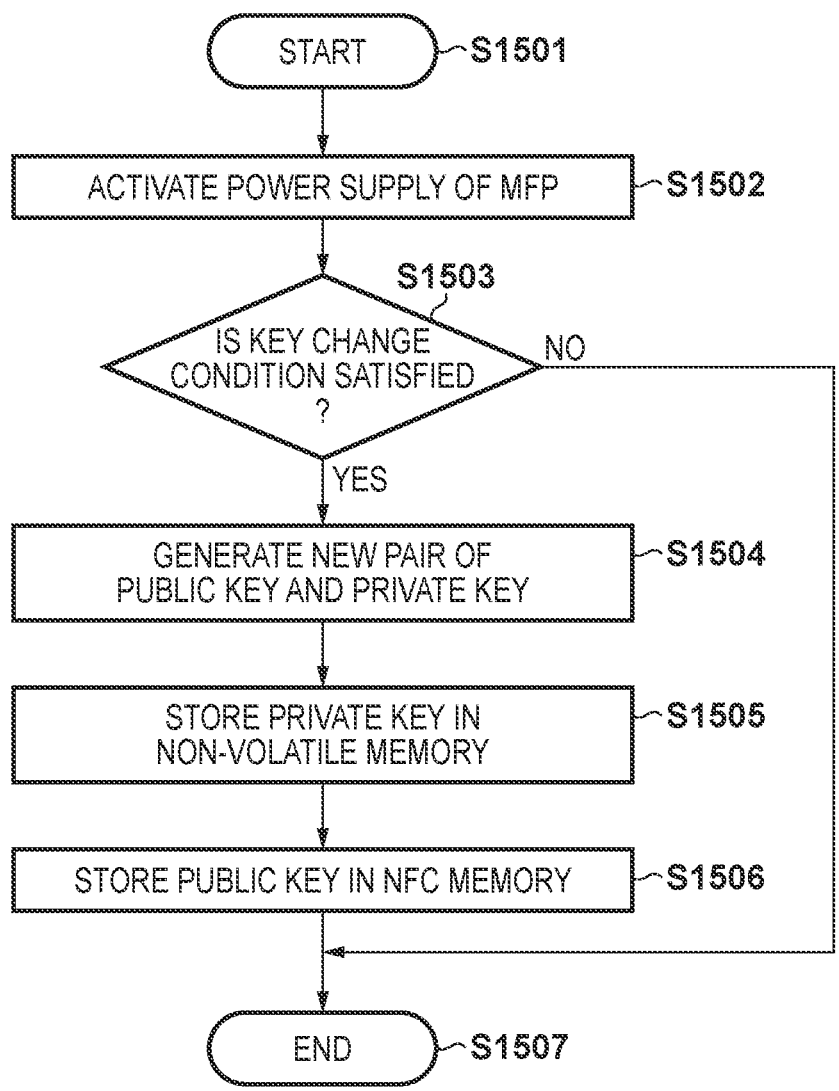
FIG. 15 is a flowchart illustrating a processing procedure of changing a pair of the public key and private key of an MFP.

FIG. 15 is a flowchart illustrating processing of changing a pair of the public key and private key of an MFP 30. The processing shown in FIG. 15 is implemented when, for example, a CPU 502 loads a program stored in a ROM 503 into a RAM 504, and executes it.

The CPU 502 receives a power supply activation start trigger in step S1501, and activates the power supply of the MFP 30 in step S1502. In step S1503, the CPU 502 determines whether a key change condition is satisfied. If it is determined that the key change condition is satisfied, the process advances to step S1504; otherwise, the processing shown in FIG. 15 is terminated in step S1507.

An example of the key change condition may be detection of an event in which the power supply of the MFP 30 is activated or an event in which the power supply is turned off. A key is regularly renewed by changing the key every time the power supply is activated or turned off, thereby enhancing the security. Furthermore, an example of the key change condition may be the use of the key for encryption or the like. That is, the public key used once will not be used next time, and is changed to a new key. In this case, a private key is held for a predetermined period, or a history of a predetermined number of private keys is held. Under such condition, it is possible to use a new key every time, thereby enhancing the security and uniquely specifying the user of the public key.

If it is determined in step S1503 that the key change condition is satisfied, the CPU 502 generates, in step S1504, a new pair of a public key and private key. In step S1505, the CPU 502 stores the private key in an MFP private key 801. In step S1506, the CPU 502 stores the public key in an MFP public key 702. After that, in step S1507, the processing shown in FIG. 15 is terminated. By executing the above-described processing, the MFP 30 can hold the MFP public key 702 in the NFC memory of an NFC unit 517, and hold the MFP private key in a non-volatile memory 505. Note that the processing shown in FIG. 15 according to the fourth embodiment may be executed before each of the processes shown in FIGS. 12 to 14 described in the first to third embodiments is executed, or after each of the processes shown in FIGS. 12 to 14 is completed.

Fifth Embodiment

Figure 16:
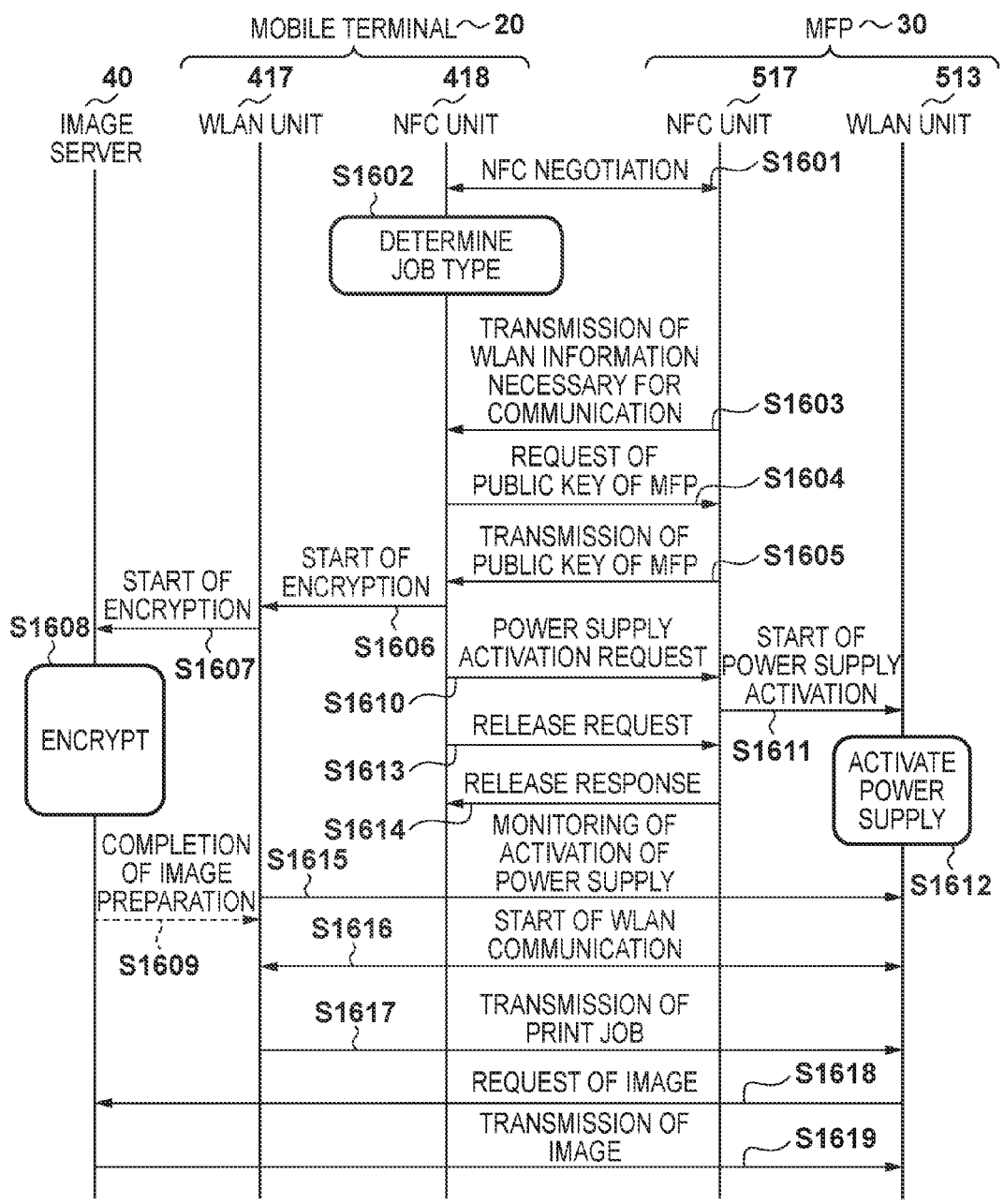
FIG. 16 is a sequence chart showing another operation of transmitting a print job from a mobile terminal to an MFP.

An operation when print data of a print job exists not in a mobile terminal 20 but in an image server 40 will be described with reference to FIG. 16. The difference from FIG. 12 will be explained below.

In S1601, the above-described NFC negotiation is performed. In S1602, if the CPU 402 determines the type of job to be executed is a print job, it further determines the storage location of image data to be printed. Assume that it is determined that the image data to be printed exists in the image server 40.

Figure 12:
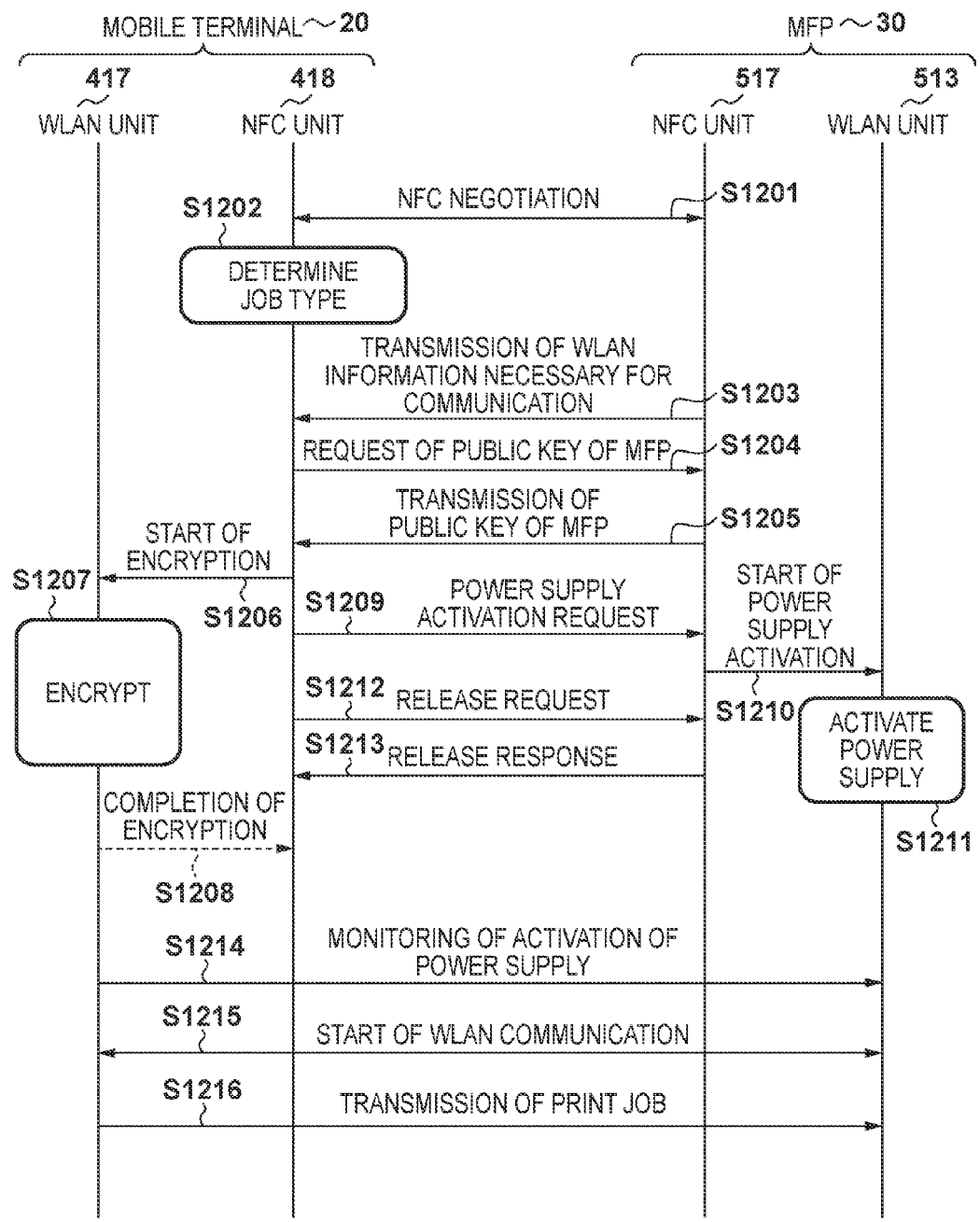
FIG. 12 is a sequence chart showing an operation of transmitting a print job from the mobile terminal to the MFP.

Processes in S1603 to S1606 are the same as those in S1203 to S1206 of FIG. 12.

In S1607, a CPU 402 transmits an MFP public key 702 to the image server 40, and requests, of the image server 40, encryption of the image data to be printed.

In S1608, the image server 40 performs encryption of the image data requested in S1607 by using the MFP public key 702. Upon end of the encryption processing, the image server 40 notifies the mobile terminal 20 of it.

In S1609, the CPU 402 receives the encryption end notification from the image server 40.

Processes in S1610 to S1612 are the same as those in S1209 to S1211. Processes in S1613 and S1614 are the same as those in S1212 and S1213. Processes in S1609, S1615, and S1616 are the same as those in S1208, S1214, and S1215.

In a print job transmitted from the mobile terminal 20 to an MFP 30 in S1617, the address of the image server 40 is described as the acquisition destination of the image data to be printed. Therefore, the MFP 30 requests, in S1618, the image data to be printed of the image server 40, and acquires, in S1619, the image data to execute the print job.

If the image data to be printed exists in the image server 40, the processing time is longer by the request operation to the image server 40, as compared with the operation shown in FIG. 12. In this embodiment, encryption of the image data can be asynchronously performed in parallel with the power supply activation processing in S1610, S1611, and S1612, and the NFC release processing in S1613 and S1614. Therefore, when the user executes a print job, it is possible to improve the effect obtained by performing a print job execution operation by moving the mobile terminal 20 closer to the MFP 30 without waiting for activation of the MFP 30.

Sixth Embodiment

An operation obtained by adding, to the operation of a scan job shown in FIG. 13, an operation of encrypting a scan job to be transmitted from a mobile terminal 20 to an MFP 30 and the public key of the mobile terminal 20 will be described with reference to FIG. 17. Processes in S1703 to S1707 of FIG. 17 are added to FIG. 13, and the added processes will be explained below.

In S1703, an NFC unit 418 requests an MFP public key 702 of an NFC unit 517 of the MFP 30. In S1704, the NFC unit 418 acquires the MFP public key 702 from the NFC unit 517.

In S1705, upon acquiring the MFP public key 702, the NFC unit 418 notifies a CPU 402 of an encryption start instruction. In S1706, the CPU 402 encrypts the scan job and the public key of the mobile terminal 20. In S1707, the CPU 402 sends an encryption end notification to the NFC unit 418. In S1712, when executing the scan job, a CPU 502 decrypts the scan job and the public key of the mobile terminal 20 using an MFP private key 801, and executes the scan job.

Figure 13:
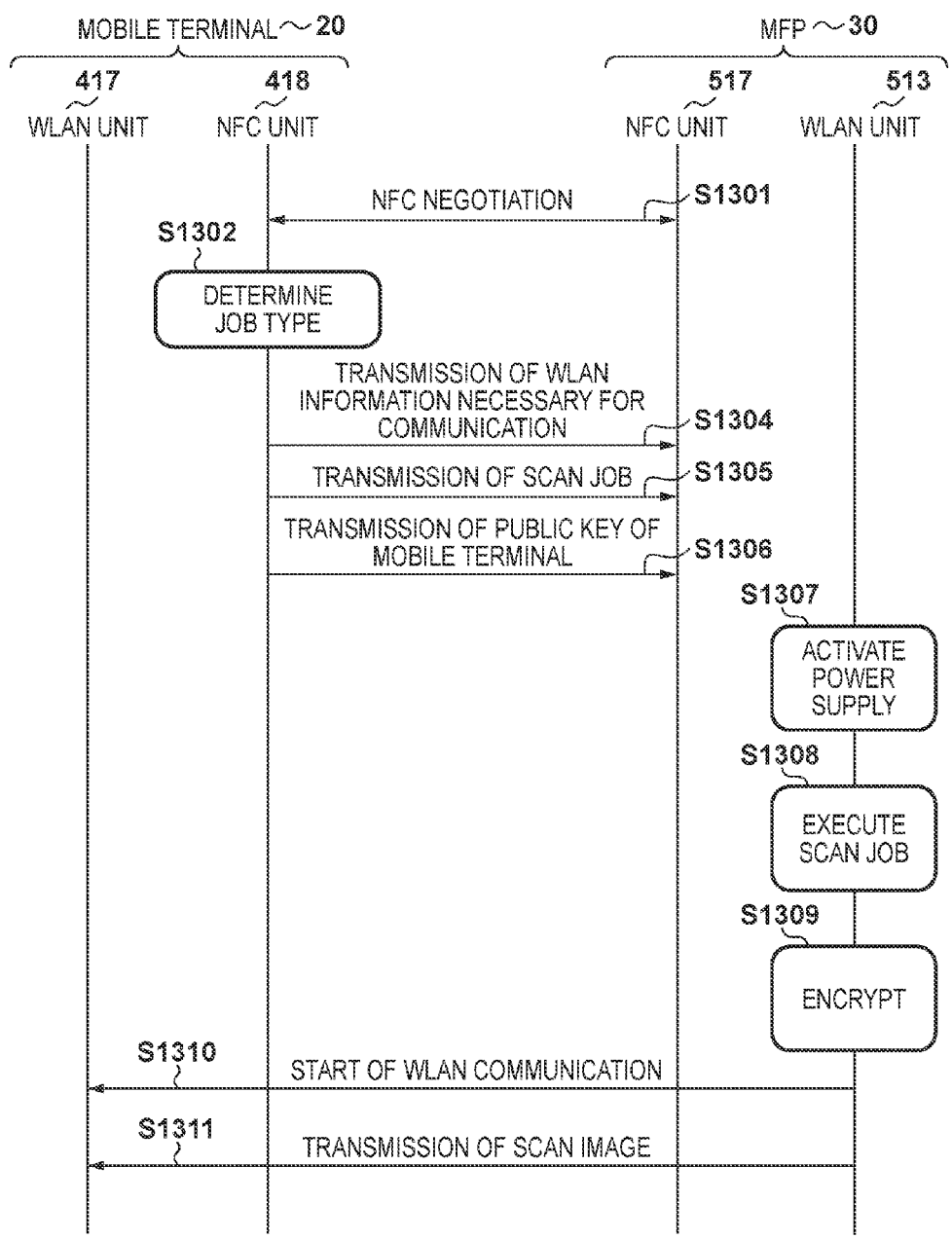
FIG. 13 is a sequence chart showing an operation of transmitting a scan job from a mobile terminal to an MFP.

The remaining processes of FIG. 17 are the same as in FIG. 13. In this embodiment, it is possible to prevent information about the mobile terminal 20 such as the contents of the scan job and the public key of the mobile terminal 20 from leaking, thereby maintaining the security.

Note that this specification describes exchange between the mobile terminal 20 and the MFP 30. However, the present invention is not limited to this. For example, data may be exchanged between the mobile terminal 20 and a digital camera or between the mobile terminal 20 and a PC.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-011769, filed Jan. 23, 2015, which is hereby incorporated by reference herein in its entirety.

What is claimed is:

1. A system of switching communications between a first communication apparatus and a second communication apparatus comprising:
   at least one hardware processor and a first memory and a second memory, wherein the second memory is different from the first memory;
   each of the first communication apparatus and the second communication apparatus including a near field short distance wireless communication unit performing a short distance wireless communication and a long distance wireless communication unit performing a long distance wireless communication, wherein a communication distance of the long distance wireless communication is longer than a communication distance of the short distance wireless communication, and a storing unit configured to store a public key in the first memory of the short distance wireless communication unit, respectively, on each of the first communication apparatus and the second communication apparatus and to store a private key corresponding to the public key in the second memory, respectively, on each of the first communication apparatus and the second communication apparatus;
   the first communication apparatus further including
   an acquisition unit configured to acquire connection information and the public key stored in the first memory of the short distance wireless communication unit of the second communication apparatus via the short distance wireless communication,
   an encryption unit configured to encrypt, by using the public key acquired by the acquisition unit, data to be processed by the second communication apparatus, and
   a transmission unit configured to transmit the encrypted data to the second communication apparatus via an established long distance communication by using the connection information, and
   the second communication apparatus further including
   a decryption unit configured to decrypt, by the private key which corresponds to the public key and is stored in the second memory of the second communication apparatus, the encrypted data transmitted by the transmission unit,
   wherein, while the second communication apparatus operates in a power saving state, the public key stored in the first memory of the short distance wireless communication unit of the second communication apparatus is able to be acquired by the first communication apparatus, and the private key stored in the second memory of the second communication apparatus is not able to be acquired by the first communication apparatus.

2. The system according to claim 1, wherein
   the first communication apparatus further includes a request unit configured to request an apparatus to encrypt the data using the acquired public key, and
   the transmission unit transmits the data encrypted by the apparatus to the second communication apparatus.

3. The system according to claim 1, wherein the first communication apparatus further includes a request unit configured to request, while encryption of the data is performed, activation of the second communication apparatus.

4. The system according to claim 1, wherein
   when scan processing is performed,
   the first communication apparatus transmits a second public key to the second communication apparatus via the short distance wireless communication,
   the second communication apparatus encrypts scan data based on the transmitted second public key and then transmits the encrypted scan data to the first communication apparatus.

5. The system according to claim 1, wherein the second communication apparatus further includes
   a generation unit configured to generate a new public key different from the public key stored in the first memory of the short distance wireless communication unit of the second communication apparatus, and a private key corresponding to the new public key, and
   a storage unit configured to store the new public key generated by the generation unit in the first memory of the short distance wireless communication unit of the second communication apparatus.

6. The system according to claim 1, wherein the second memory is a non-volatile memory of the second communication apparatus.

7. The system according to claim 1, wherein
   the first communication apparatus is a mobile terminal and the second communication apparatus is an image processing apparatus including a printing unit, and
   the second communication apparatus executes print processing of the decrypted data.

8. The system according to claim 1, wherein the first communication apparatus is an image processing apparatus including a reading unit, and the second communication apparatus is a mobile terminal capable of requesting scan processing.

9. A communication apparatus comprising:
   at least one hardware processor and a first memory and a second memory;
   a near field wireless communication unit performing a near field wireless communication; and
   a storage unit configured to store a public key in the first memory of the near field wireless communication unit, and store a private key corresponding to the public key in the second memory different from the first memory of the near field wireless communication unit,
   wherein, while the communication apparatus operates in a power saving state, the public key stored in the first memory of the near field wireless communication unit of the communication apparatus is able to be acquired by an external apparatus and the private key stored in the second memory of the communication apparatus is not able to be acquired by the external apparatus, and wherein the external apparatus acquires connection information and the public key stored in the first memory of the near field wireless communication unit via the near field wireless communication.

10. The apparatus according to claim 9, further comprising:
a wireless communication unit configured to execute communication with a communication distance longer than that of communication performed by the near field wireless communication unit; and
a decryption unit configured to decrypt, by using the private key, data which has been acquired by the wireless communication unit and encrypted by using the public key.

11. The apparatus according to claim 9, further comprising:
a printing unit configured to print the decrypted data on a printing medium.

12. A method of operating a system having a first communication apparatus and a second communication apparatus, each of the first communication apparatus and the second communication apparatus including a near field short distance wireless communication unit performing a short distance wireless communication and a long distance wireless communication unit performing a long distance wireless communication, wherein a communication distance of the long distance wireless communication is longer than a communication distance of the short distance wireless communication, and a storing unit to store a public key in a first memory of the short distance wireless communication unit, respectively, on each of the first communication apparatus and the second communication apparatus and to store a private key corresponding to the public key in a second memory, different from the first memory, respectively, on each of the first communication apparatus and the second communication apparatus, said method comprising:
in the first communication apparatus,
acquiring connection information and the public key stored in the first memory or the short distance wireless communication unit of the second communication apparatus via the short distance wireless communication;
encrypting, by using the acquired public key, data to be processed by the second communication apparatus; and
transmitting the encrypted data to the second communication apparatus via an established long distance communication by using the connection information, and
in the second communication apparatus,
decrypting, in the second communication apparatus, by the private key which corresponds to the public key and is stored in the second memory of the second communication apparatus, the transmitted encrypted data,
wherein, while the second communication apparatus operates in a power saving state, the public key stored in the first memory of the short distance wireless communication unit of the second communication apparatus is able to be acquired by the first communication apparatus and the private key stored in the second memory of the second communication apparatus is not able to be acquired by the first communication apparatus.

13. A method of operating a communication apparatus, comprising:
providing a near field wireless communication unit performing a near field wireless communication; and
storing a public key in a first memory of the near field wireless communication unit, and storing a private key corresponding to the public key in a second memory different from the first memory of the near field wireless communication unit,
wherein, while the communication apparatus operates in a power saving state, the public key stored in the first memory of the near field wireless communication unit is able to be acquired by an external apparatus and the private key stored in the second memory of the communication apparatus is not able to be acquired by the external apparatus, and
wherein the external apparatus acquires connection information and the public key stored in the first memory of the near field wireless communication unit via the near field wireless communication.

14. The method according to claim 13, wherein the communication apparatus is a printing apparatus.

15. The method according to claim 13, further comprising a step decrypting, by the private key which corresponds to the public key and is stored in the second memory of the communication apparatus, the encrypted data transmitted by the external apparatus.

16. The method according to claim 15, further comprising a step of printing based on the decrypted data.

* * * * *